United States Patent Office 3,080,364
Patented Mar. 5, 1963

3,080,364
3,6,8-TRIKETOPYRIMIDO[5,4-]1,4-THIAZINES AND PROCESS
Elmer F. Schroeder, Chicago, Ill., assignor to G. D. Searle & Co., Chicago, Ill., a corporation of Delaware
No Drawing. Filed May 26, 1961, Ser. No. 112,792
11 Claims. (Cl. 260—243)

The present invention relates to novel bicyclic, heterocyclic, sulfur- and nitrogen-containing compounds and, more particularly, to 3,6,8-triketopyrimido[5,4-b]-1,4-thiazines of the formula

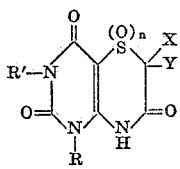

wherein R and R' are members of the class consisting of hydrogen, lower alkyl, hydroxy(lower alkyl), and lower alkenyl, X and Y are members of the class consisting of hydrogen, chlorine, bromine, hydroxy, —O-(lower alkyl), —O-(lower alkylene)Cl, and —OCO-(lower alkyl), and n is 0, 1, or 2.

The lower alkyl radicals represented in the foregoing structural formula are, for example, methyl, ethyl, propyl, butyl, pentyl, hexyl, and the branched-chain isomers thereof. Examples of the lower alkenyl radicals represented by R and R' are vinyl, propenyl, allyl, butenyl, pentenyl, hexenyl, and the branched-chain isomers thereof. The lower alkylene radicals encompassed by the X and Y terms are typified by ethylene, trimethylene, tetramethylene, pentamethylene, and the branched-chain isomers thereof.

This application is a continuation-in-part of my copending applications, Serial No. 824,777, filed July 3, 1959, and Serial No. 48,370, filed August 9, 1960, now abandoned.

The preferred embodiments of this invention are those compounds in which R and R' are lower alkyl, hydroxy-(lower alkyl), or lower alkenyl radicals.

Starting materials suitable for the manufacture of the compounds of this invention are the 6-amino-5-carboxymethylmercaptouracils and corresponding sulfoxides and sulfones, which are represented by the structural formula

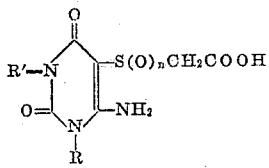

wherein R, R', and n are as defined supra. Treatment of these starting materials with a dehydrating agent such as acetic anhydride at a temperature of 100–150° for a period of 30 minutes-8 hours results in the corresponding bicyclic compounds of this invention. Typically, a mixture of 1,3-dimethyl-5-carboxymethylmercapto-6-aminouracil and excess acetic anhydride is heated at reflux for about 30 minutes to produce 5,7-dimethyl-3,6,8-triketopyrimido[5,4-b]1,4-thiazine.

Treatment of the aforementioned 3,6,8-triketopyrimido-[5,4-b]1,4-thiazines with a limited quantity of a halogenating agent affords the instant 2-halo derivatives, while the use of excess reagent produces the 2,2-dihalo compounds of this invention. These halogenated compounds yield the corresponding mono- and disubstituted alkoxy, haloalkoxy, and alkanoyloxy substances when allowed to react with the appropriate alkanol, haloalkanol, or alkanoic acid, respectively. Hydrolysis of these 2-halo compounds results in the corresponding 2-hydroxy derivatives. An alternate route to these 2-oxygenated compounds involves oxidation of the corresponding 5,7-dialkyl-3,6,8-triketopyrimido[5,4-b]1,4-thiazines to the 1-oxides, which are then treated with the alkanol, haloalkanol, or alkanoic acid. The instant 2,2-bisoxygenated compounds can be manufactured by repetition of this two-step process.

The compounds of this invention exhibit valuable pharmacological properties as is exemplified by their diuretic, androgenic, anti-inflammatory, hypotensive, anorectic, central nervous system stimulating, and broncho-dilating activity. In addition, they are anti-viral and anti-bacterial agents and inhibitors of dicotyledonous seed germination.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A solution of 6.07 parts of thioglycolic acid in 25 parts of water, previously adjusted to pH 7 with sodium hydroxide, is added to a suspension of 13.9 parts of 1-n-propyl-3-ethyl-5-chloro-6-aminouracil in a solution of 2.4 parts of sodium hydroxide in 35 parts of water. The resulting mixture is heated at 100° for 30 minutes during which time complete solution takes place. The reaction mixture is acidified with dilute hydrochloric acid and cooled. The oily precipitate which separates is stirred and allowed to stand until solidified. It is then collected by filtration and washed with water. Further purification is effected by dissolution in 125 parts of water containing 2.5 parts of sodium hydroxide, decolorization with activated carbon, and acidification with hydrochloric acid. The solid which separates is collected on a filter, washed with water, and dried at 80° to yield 1-propyl-3-ethyl-5-carboxymethylmercapto-6-aminouracil melting at 182–184°.

*Example 2*

A solution of 6.07 parts of thioglycolic acid in 25 parts of water, which has been neutralized with sodium hydroxide, is added to a suspension of 11.37 parts of 1,3-dimethyl-5-chloro-6-aminouracil in a solution of 2.4 parts of sodium hydroxide in 35 parts of water and the mixture heated for 30 minutes at 100°, during which time complete solution occurs. After cooling and acidifying with a slight excess of dilute hydrochloric acid, the crystals which appear are recovered by filtration, washed with water and dried to yield 1,3-dimethyl-5-carboxymethyl-mercapto-6-aminouracil as colorless crystals melting at 218–220° with effervescence. The product is readily soluble in dilute aqueous sodium hydroxide.

*Example 3*

A suspension of 18.37 parts of 1-allyl-3-ethyl-5-chloro-6-aminouracil in a solution of 3.2 parts of sodium hydroxide and 50 parts of water is treated with a solution of 8.1 parts of thioglycolic acid in 25 parts of water which has been previously neutralized with sodium hydroxide. The reaction mixture is heated for one hour at 100° during which time complete solution takes place. The reaction mixture is diluted with 75 parts of water, made acid with hydrochloric acid and the precipitate which forms recovered by filtration. The precipitate is washed with water and purified by dissolution in 200 parts of water containing 4 parts of sodium hydroxide, decolorization with activated carbon and acidification with hydrochloric acid. A crystalline precipitate forms which is recovered by filtration, washed and dried at 80° to yield 1-allyl-3-ethyl-5-carboxymethylmercapto-6-aminouracil, M.P. 176–177°.

Substitution of an equal amount of 1-methallyl-3-methyl-5-chloro-6-aminouracil for the 1-allyl-3-ethyl-5-chloro-6-aminouracil used in the foregoing procedure yields 1-methallyl-3-methyl-5-carboxymethylmercapto-6-aminouracil.

*Example 4*

A solution of 8.1 parts of thioglycolic acid in 35 parts of water, previously neutralized with sodium hydroxide, is added to a suspension of 21.9 parts of 1,3-di-n-butyl-5-chloro-6-aminouracil in 50 parts of water containing 3.2 parts of sodium hydroxide. The reaction mixture is heated at 100° for one hour, cooled, made acid with a slight excess of hydrochloric acid, and the oily precipitate which forms stirred and allowed to stand until solidified. The solid thus obtained is recovered by filtration, washed with water and purified by dissolution in 200 parts of water containing 4 parts of sodium hydroxide. The alkaline solution is decolorized with activated carbon, filtered and acidified with hydrochloric acid. The oily precipitate is stirred and chilled to induce crystallization, triturated with water and dried at 80° to yield 1,3-di-n-butyl-5-carboxymethylmercapto-6-aminouracil which melts at 157–159° with prior softening at 155°.

*Example 5*

A suspension of 14 parts of 1-(2-hydroxyethyl)-3-ethyl-5-chloro-6-aminouracil in 35 parts of water containing 2.4 parts of sodium hydroxide is treated with a solution of 6 parts of thioglycolic acid in 15 parts of water which has been previously neutralized with sodium hydroxide. The reaction mixture is heated at 100° for one hour, cooled, made acid with hydrochloric acid and chilled for several hours. The crystalline material thus obtained is recovered by filtration, washed with water and recrystallized from water solution to yield 1-(2-hydroxyethyl)-3-ethyl-5-carboxymethylmercapto-6-aminouracil which melts at 206–207°.

Substitution of 14 parts of 1-(3-hydroxypropyl)-3-methyl-5-chloro-6-aminouracil for the hydroxyethyl derivative as a starting material in the foregoing procedure yields 1-(3-hydroxypropyl)-3-methyl-5-carboxymethylmercapto-6-aminouracil.

*Example 6*

A mixture of 12.3 parts of 1,3-dimethyl-5-carboxymethylmercapto-6-aminouracil and 43.5 parts of acetic anhydride is heated at reflux for 5 minutes. During this reflux period, complete solution first occurs, then a crystalline precipitate is formed. The reaction mixture is heated for an additional 30 minutes on a steam bath, the excess acetic anhydride destroyed by addition of 10 parts of water to the hot reaction mixture followed by an additional 100 parts of water, after which the mixture is cooled and the crystals collected by filtration. The crude reaction product is washed with water and purified by dissolution in 60 parts of water containing 2 parts of sodium hydroxide, decolorization with activated carbon followed by acidification with acetic acid. The crystalline precipitate which forms is filtered off, washed with water and dried at 80° to yield 5,7-dimethyl-3,6,8-triketopyrimido[5,4-b]-1,4-thiazine which melts at 270–272° (with darkening at 260°).

*Example 7*

A mixture of 45.6 parts of 1-n-propyl-3-ethyl-5-carboxymethylmercapto-6-aminouracil and 105 parts of acetic anhydride is heated on the steam-bath for 4 hours. The excess acetic anhydride is destroyed by the cautious addition of 20 parts of water and the resulting mixture is diluted with 450 parts of water. On cooling, the crystalline precipitate which forms is recovered by filtration, washed with water and purified by dissolution in a solution of 6.4 parts of sodium hydroxide in 600 parts of water, decolorization with activated carbon and acidification with glacial acetic acid. The mixture is chilled and the precipitate which forms is recovered by filtration, washed with water and dried. After recrystallization from 300 parts of ethanol, the product, 5-n-propyl-7-ethyl-3,6,8-triketopyrimido[5,4-b]1,4-thiazine melts at 186–188°.

*Example 8*

A mixture of 13.16 parts of 1,3-di-n-butyl-5-carboxymethylmercapto-6-aminouracil and 26.5 parts of acetic anhydride is heated on the steam-bath for 4 hours. During the heating period a homogeneous mixture is first formed, followed by precipitation of a solid. The excess acetic anhydride is destroyed by the cautious addition of 100 parts of water and heating continued for 15 minutes. After cooling, the crystalline residue is recovered by filtration, washed with water, dried and recrystallized from 300 parts of ethanol, including the use of activated carbon, to yield 5,7-di-n-butyl-3,6,8-triketopyrimido[5,4-b]1,4-thiazine which melts at 213–214°.

*Example 9*

A mixture of 11.4 parts of 1-allyl-3-ethyl-5-carboxymethylmercapto-6-aminouracil and 26.5 parts of acetic anhydride is heated on the steam-bath for 4 hours. The excess acetic anhydride is destroyed by adding 15 parts of water cautiously to the hot reaction mixture followed by the addition of 75 parts more of water. The reaction mixture is chilled and the crystalline residue which forms is collected on a filter, washed with water and purified by dissolution in a solution of 1.5 parts of sodium hydroxide in 100 parts of water, decolorization with activated carbon and acidification with glacial acetic acid. The oily precipitate which initially forms soon solidifies and the solid thus obtained is recovered by filtration, washed with water and dried to yield 5-allyl-7-ethyl-3,6,8-triketopyrimido[5,4-b]1,4-thiazine which melts at 231–233°.

By substituting equivalent quantities of 1-methallyl-3-methyl-5-carboxymethylmercapto-6-aminouracil, 1-ethyl-3-allyl-5-carboxymethylmercapto-6-aminouracil, or 1-methyl-3-methallyl-5-carboxymethylmercapto-6-aminouracil and otherwise proceeding according to the herein described processes; 5-methallyl-7-methyl-3,6,8-triketopyrimido[5,4-b]1,4-thiazine, 5-ethyl-7-allyl-3,6,8-triketopyrimido[5,4-b]1,4-thiazine, and 5-methyl-7-methallyl-3,6,8-triketopyrimido[5,4-b]1,4-thiazine, respectively, are obtained.

*Example 10*

A mixture of 5 parts of 1-(2-hydroxyethyl)-3-ethyl-5-carboxymethylmercapto-6-aminouracil and 26.5 parts of acetic anhydride is heated on the steam-bath for 4 hours. The excess acetic anhydride is destroyed by the cautious addition of 15 parts of water and the reaction mixture is evaporated to dryness under reduced pressure. The residue is treated with 25 parts of water, and the mixture heated on the steam-bath while adding 9 parts of 5 N sodium hydroxide. The mixture is diluted further with 25 parts of water, decolorized with activated carbon and acidified with glacial acetic acid. The mixture is cooled, the crystalline residue recovered by filtration, washed with water and purified by dissolution in 30 parts of 0.5 N sodium hydroxide, decolorization with activated carbon and acidification with acetic acid. After cooling, the crystalline residue is recovered by filtration, washed with water and dried to yield 5-(2-hydroxyethyl)-7-ethyl-3,6,8-triketopyrimido[5,4-b]1,4-thiazine which melts at 225–226°.

Substitution of equivalent quantities of 1-(3-hydroxypropyl)-3-methyl - 5 - carboxymethylmercapto-6-aminouracil, 1-ethyl-3-(2 - hydroxyethyl)-5-carboxymethylmercapto-6-aminouracil, or 1-allyl-3-(3 - hydroxypropyl)-5-carboxymethylmercapto-6-aminouracil in the instant process results in 5-(3-hydroxypropyl)-7-methyl-3,6,8-triketopyrimido[5,4-b]1,4-thiazine, 5-ethyl-7-(2-hydroxyethyl)-3,6,8-triketopyrimido[5,4-b]1,4-thiazine, and 5-allyl-7-(3-hydroxypropyl) - 3,6,8 - triketopyrimido[5,4 - b]1,4 - thiazine, respectively.

Example 11

To an ice-cold solution of 11 parts of 5-propyl-7-ethyl-3,6,8-triketopyrimido[5,4-b]1,4-thiazine in 180 parts of dry chloroform is added slowly, at 10–15°, a solution of 6 parts perbenzoic acid in 108 parts of dry benzene. The reaction mixture is then allowed to stand at 5–10° for about one hour, and the precipitate which forms is collected by filtration, washed on the filter with 50% chloroform in benzene, then recrystallized from butanone to afford 5-propyl-7-ethyl-3,6,8 - triketopyrimido[5,4-b]1,4-thiazine 1-oxide, which melts at about 165–167° with decomposition.

By substituting 9 parts of 5,7-dimethyl-3,6,8-triketopyrimido[5,4-b]1,4-thiazine in the process of this example, 5,7-dimethyl-3,6,8 - triketopyrimido[5,4-b]1,4-thiazine 1-oxide is obtained.

Example 12

To a mixture of 13 parts of 5-propyl-7-ethyl-3,6,8-triketopyrimido[5,4-b]1,4-thiazine, 5 parts of sodium bicarbonate, and 186 parts of anhydrous chloroform is added slowly, with stirring, a solution of 8 parts of bromine in 75 parts of dry chloroform. The resulting mixture is stirred at 10–15° for about 15 minutes, then clarified by filtration. This filtrate is evaporated to dryness under nitrogen, and the resulting residue is recrystallized from ethyl acetate to afford light yellow crystals of 2-bromo-5-propyl-7-ethyl - 3,6,8-triketopyrimido[5,4-b]1,4-thiazine, M.P. about 197–199° (dec.).

By substituting 11 parts of 5,7-dimethyl-3,6,8-triketopyrimido[5,4-b]1,4-thiazine and otherwise proceeding according to the process of this example, 2-bromo-5,7-dimethyl - 3,6,8 - triketopyrimido[5,4-b]1,4 - thiazine is obtained.

Example 13

To a suspension of 16.2 parts of 5-propyl-7-ethyl-3,6,8-triketopyrimido[5,4-b]1,4-thiazine in 94.5 parts of glacial acetic acid, in a container protected from the moisture of the air, is added 8.1 parts of sulfuryl chloride. The mixture becomes homogeneous shortly after the addition and the temperature rises rapidly to about 40°. The solution is allowed to stand at room temperature for about 30 minutes, then is diluted with 60 parts of hexane and cooled by means of an ice bath. The resulting crystalline product is collected by filtration, washed successively with hexane-glacial acetic acid and hexane, then dried to yield 2-chloro-5-propyl-7-ethyl-3,6,8-triketopyrimido[5,4-b]1,4-thiazine. Recrystallization from ethyl acetate-hexane affords the pure product melting at about 203–205° (dec.).

Example 14

*Method A.*—A mixture of 20 parts of 5-propyl-7-ethyl-3,6,8-triketopyrimido[5,4-b]1,4-thiazine 1-oxide and 82 parts of glacial acetic acid is heated on the steam-bath for several minutes, then cooled slightly and diluted with water. Further cooling to room temperature results in precipitation of the product, which is collected by filtration and recrystallized from aqueous acetic acid to afford 2-acetoxy-5-propyl-7 - ethyl - 3,6,8 - triketopyrimido-[5,4-b]1,4-thiazine. This substance melts at about 159–160° with decomposition and effervescence.

*Method B.*—A mixture of 35 parts of 2-bromo-5-propyl-7-ethyl-3,6,8-triketopyrimido[5,4-b]1,4 - thiazine, 82 parts of sodium acetate and 200 parts of glacial acetic acid is heated on the steam bath for several minutes, then cooled slightly and diluted with water. The resulting aqueous mixture is cooled to room temperature and the precipitate which forms is collected by filtration, and recrystallized from chloroform-hexane to produce 2-acetoxy-5-propyl-7-ethyl-3,6,8 - triketopyrimido[5,4-b] - 1,4-thiazine, identical with the product obtained by Method A.

Example 15

The substitution of 17 parts of 5,7-dimethyl-3,6,8-triketopyrimido[5,4-b]1,4-thiazine 1-oxide in the process of Method A, Example 14, results in 2-acetoxy-5,7-dimethyl-3,6,8-triketopyrimido[5,4-b]1,4-thiazine.

Example 16

By substituting 101 parts of propionic acid in the process of Method A, Example 14, 2-propionoxy-5-propyl-7-ethyl-3,6,8 - triketopyrimido[5,4-b]1,4-thiazine is obtained.

Example 17

The reaction of 101 parts of propionic acid and 17 parts of 5,7-dimethyl-3,6,8 - triketopyrimido[5,4-b]1,4-thiazine 1-oxide by the procedure described in Method A, Example 14, affords 2-propionoxy-5,7-dimethyl-3,6,8-triketopyrimido[5,4-b]1,4-thiazine.

Example 18

A solution of 5 parts of 5-propyl-7-ethyl-3,6,8-triketopyrimido[5,4-b]1,4-thiazine 1-oxide in 48 parts of methanol is heated at reflux for several minutes, then cooled and allowed to stand at room temperature for several hours. The precipitate which forms is collected by filtration, washed on the filter with methanol and dried to yield colorless crystals of 2-methoxy-5-propyl-7-ethyl-3,6,8-triketopyrimido[5,4-b]1,4-thiazine, M.P. about 199–200° (dec.).

By substituting 4 parts of 5,7-dimethyl-3,6,8- triketopyrimido[5,4-b]1,4-thiazine 1-oxide and otherwise proceeding according to the process of this example, 2-methoxy-5,7 - dimethyl-3,6,8 - triketopyrimido[5,4-b]1,4-thiazine is obtained.

Example 19

*Method A.*—A solution of 10 parts of 5-propyl-7-ethyl-3,6,8-triketopyrimido[5,4-b]1,4-thiazine 1-oxide in 115 parts of ethanol is heated at reflux for several minutes, then is treated with decolorizing carbon. The resulting solution is allowed to cool, and the precipitate which forms is collected by filtration to produce 2-ethoxy-5-propyl-7-ethyl-3,6,8 - triketopyrimido[5,4-b]1,4 - thiazine as colorless crystals, melting at about 163–165°.

*Method B.*—A solution of 17 parts of 2-bromo-5-propyl-7-ethyl-3,6,8 - triketopyrimido[5,4-b]1,4-thiazine in 120 parts of ethanol is heated at reflux for several minutes, then is clarified by filtration. The filtrate is cooled and allowed to stand at room temperature for several hours, resulting in precipitation of the product, which is collected by filtration, washed on the filter with ethanol, and dried to yield 2-ethoxy-5-propyl-7-ethyl-3,6,8-triketopyrimido[5,4-b]1,4-thiazine, identical with the product prepared by the procedure of Method A.

Example 20

A mixture of 27 parts of 5-propyl-7-ethyl-3,6,8-triketopyrimido[5,4-b]1,4-thiazine, 460 parts of carbon tetrachloride and 27 parts of sulfuryl chloride is heated at reflux for about 1½ hours, then is clarified by filtration. The filtrate is diluted with hexane, and the diluted solution is cooled to effect precipitation of the product. The resulting solid is collected by filtration, washed on the filter with hexane, and dried to yield the pale yellow 2,2-dichloro-5-propyl - 7-ethyl-3,6,8-triketopyrimido[5,4-b]1,4-thiazine, which melts at about 145–147°.

The substitution of 23 parts of 5,7-dimethyl-3,6,8-triketopyrimido[5,4-b]1,4-thiazine in the process of this example results in 2,2-dichloro-5,7-dimethyl-3,6,8-triketopyrimido[5,4-b]1,4-thiazine.

Example 21

To 7 parts of crude 2,2-dichloro-5-propyl-7-ethyl-3,6,8-triketopyrimido[5,4-b]1,4-thiazine is added 28 parts of methanol, and the resulting solution is allowed to stand at room temperature for about one hour, during which time precipitation occurs. This mixture is cooled by means of an ice bath, then filtered to afford the solid product. This solid is purified by washing on the filter with 50% aqueous methanol followed by recrystallization from methanol to afford colorless crystals of 2,2-dimethoxy-5-propyl-7-ethyl-3,6,8-triketopyrimido[5,4-b]-1,4-thiazine, M.P. about 162–163°.

The substitution of 6 parts of 2,2-dichloro-5,7-dimethyl-3,6,8-triketopyrimido[5,4-b]1,4-thiazine in the procedure of this example results in 2,2-dimethoxy-5,7-dimethyl-3,6,8-triketopyrimido[5,4-b]1,4-thiazine.

Example 22

To a mixture of 16 parts of 2-ethoxy-5-propyl-7-ethyl-3,6,8-triketopyrimido[5,4-b]1,4-thiazine and 60 parts of glacial acetic acid is added slowly with stirring, at 30–40°, 10 parts of a 40% solution of peracetic acid in glacial acetic acid. The resulting homogeneous reaction mixture is allowed to stand at room temperature for about 30 minutes, then is diluted with water and cooled. The precipitate which forms is collected by filtration, washed on the filter with water, and dried to yield 2-ethoxy-5-propyl-7-ethyl-3,6,8-triketopyrimido[5,4-b]1,4-thiazine 1-oxide. Recrystallization from absolute ethanol affords the pure material melting at about 185–187°.

The substitution of 14 parts of 2-ethoxy-5,7-dimethyl-3,6,8-triketopyrimido[5,4-b]1,4-thiazine, 12 parts of 2-methoxy-5-propyl-7-ethyl-3,6,8-triketopyrimido[5,4-b]1,4-thiazine, or 10 parts of 2-methoxy-5,7-dimethyl-3,6,8-triketopyrimido[5,4-b]1,4-thiazine in the process of this example results in 2-ethoxy-5,7-dimethyl-3,6,8-triketopyrimido[5,4-b]1,4-thiazine 1-oxide, 2-methoxy-5-propyl-7-ethyl-3,6,8-triketopyrimido[5,4-b]1,4-thiazine 1-oxide, and 2-methoxy-5,7-dimethyl-3,6,8-triketopyrimido[5,4-b]1,4-thiazine 1-oxide, respectively.

Example 23

*Method A.*—A mixture of 10 parts of 2-ethoxy-5-propyl-7-ethyl-3,6,8-triketopyrimido[5,4-b]1,4-thiazine 1-oxide and 150 parts of absolute ethanol is heated at reflux for about 4 hours, and the resulting red solution is concentrated under reduced pressure, then diluted with water. This mixture is cooled by means of an ice bath for several hours, and the resulting precipitate is collected by filtration, washed on the filter with aqueous ethanol, then recrystallized from ethanol to afford 2,2-diethoxy-5-propyl-7-ethyl-3,6,8-triketopyrimido[5,4-b]1,4-thiazine, melting at about 165–167°.

*Method B.*—A mixture of 10 parts of 2,2-dichloro-5-propyl-7-ethyl-3,6,8-triketopyrimido[5,4-b]1,4-thiazine and 40 parts of ethanol is allowed to stand at room temperature for about 30 minutes, then is heated to reflux. The resulting red solution is diluted with water, then cooled to room temperature. The precipitate which forms is collected by filtration, washed on the filter with aqueous ethanol, and dried to yield colorless crystals of 2,2-diethoxy-5-propyl-7-ethyl-3,6,8-triketopyrimido[5,4-b]1,4-thiazine, identical with the substance of Method A.

Example 24

The substitution of 9 parts of 2-ethoxy-5,7-dimethyl-3,6,8-triketopyrimido[5,4-b]1,4-thiazine 1-oxide in the procedure of Method A, Example 23, results in 2,2-diethoxy-5,7-dimethyl-3,6,8-triketopyrimido[5,4-b]-1,4-thiazine.

Example 25

To a suspension of 4.55 parts of 5,7-dimethyl-3,6,8-triketopyrimido[5,4-b]1,4-thiazine in 52.5 parts of glacial acetic acid is added 2.7 parts of sulfuryl chloride, and the resulting mixture is allowed to stand for about 30 minutes, during which time the temperature rises to about 38° and hydrogen chloride is evolved. The solid product is collected by filtration, washed successively with glacial acetic acid and hexane, then dried to afford 2-chloro-5,7-dimethyl-3,6,8-triketopyrimido[5,4-b]1,4-thiazine, melting at about 335–337° with decomposition.

Example 26

A suspension of 1.2 parts of 2-chloro-5,7-dimethyl-3,6,8-triketopyrimido[5,4-b]1,4-thiazine in 24 parts of absolute ethanol is heated at reflux for about 10 minutes, during which time the mixture becomes homogeneous. The reaction mixture is cooled to room temperature, then cooled further by means of an ice bath to effect crystallization of the product, which is collected by filtration, washed with cold ethanol and dried to yield 2-ethoxy-5,7-dimethyl-3,6,8-triketopyrimido[5,4-b]1,4-thiazine, M.P. about 217–219° (dec.).

Example 27

A mixture of 6.08 parts of 2-chloro-5-propyl-7-ethyl-3,6,8-triketopyrimido[5,4-b]1,4-thiazine and 25 parts of n-butyl alcohol is heated at about 100° for about 3 minutes. Dilution of the reaction mixture with 50 parts of hexane followed by cooling effects crystallization of the product, which is collected by filtration, washed with water, and dried to yield 2-n-butoxy-5-propyl-7-ethyl-3,6,8-triketopyrimido[5,4-b]1,4-thiazine. Recrystallization from n-butyl alcohol-hexane affords the pure material, melting at about 136–137°.

Example 28

A suspension of 1.52 parts of 2-chloro-5-propyl-7-ethyl-3,6,8-triketopyrimido[5,4-b]1,4-thiazine in 9 parts of 2-chloroethanol is heated on the steam bath for several minutes, during which time complete solution occurs. Dilution of the red solution with 10 parts of water followed by cooling results in crystallization of the product, which is collected by filtration, washed with water, and dried. This crude product is purified by recrystallization from butanone-hexane, resulting in pure 2-(2-chloroethoxy)-5-propyl-7-ethyl-3,6,8-triketopyrimido[5,4-b]1,4-thiazine, melting at about 158–159°.

The substitution of 10.6 parts of 3-chloropropanol-1 in the process of this example results in 2-(3-chloro-n-propoxy)-5-propyl-7-ethyl-3,6,8-triketopyrimido[5,4-b]1,4-thiazine.

Example 29

*Method A.*—A suspension of 1.5 parts of 5-propyl-7-ethyl-3,6,8-triketopyrimido[5,4-b]1,4-thiazine 1-oxide in 25 parts of water is stored at room temperature for about 48 hours, then filtered to remove the solid product. This solid is dissolved in hot butanone, treated with decolorizing carbon, and filtered through diatomaceous earth. The filtrate is diluted with hexane to effect crystallization of the colorless pure product, which is collected by filtration and dried to yield 2-hydroxy-5-propyl-7-ethyl-3,6,8-triketopyrimido[5,4-b]1,4-thiazine, M.P. about 205–207° (dec.).

*Method B.*—A suspension of 5 parts of 2-acetoxy-5-propyl-7-ethyl-3,6,8-triketopyrimido[5,4-b]1,4-thiazine in 50 parts of water is heated at reflux for about 15 minutes, then cooled and filtered to afford the solid product. This solid is dissolved in hot butanone, treated with decolorizing carbon, and filtered. The filtrate is diluted with hexane, then cooled to effect crystallization of the colorless pure product. These colorless crystals are collected by filtration and dried to yield 2-hydroxy-5-propyl-7-ethyl-3,6,8-triketopyrimido[5,4-b]1,4-thiazine, which is identical with the product of Method A.

Example 30

A mixture of 9.5 parts of 1-propyl-3-ethyl-5-carboxymethylsulfonyl-6-aminouracil and 20.5 parts of acetic anhydride is heated at 100° for about 4 hours. The dark colored solution is cooled slightly, diluted with about 100 parts of absolute ethanol, then cooled further to effect crystallization of the product, which is collected by filtration, washed with ethanol, and dried. Recrystallization of this solid product from absolute ethanol affords pure 5-propyl-7-ethyl-3,6,8-triketopyrimido[5,4-b]1,4-thiazine 1,1-dioxide, M.P. about 248-249°.

By substituting 8.2 parts of 1,3-dimethyl-5-carboxymethylsulfonyl-6-aminouracil and otherwise proceeding according to the process of this example, 5,7-dimethyl-3,6,8-triketopyrimido[5,4-b]1,4-thiazine 1,1-dioxide is obtained.

Example 31

To a stirred suspension of 6.35 parts of 6-aminouracil in 60.3 parts of dimethylformamide is added dropwise, over a period of about one hour at room temperature, 6.75 parts of sulfuryl chloride. Stirring is continued for about 2 hours longer, and the reaction mixture is filtered. Dilution of the filtrate with about 150 parts of cold water results in precipitation of the product, which is collected by filtration, washed with water and dried. Recrystallization of this product from water affords 6-amino-5-chlorouracil, which darkens at about 325°, but does not melt up to 360°.

Example 32

To a suspension of 16.1 parts of 6-amino-5-chlorouracil in 60 parts of water containing 9 parts of sodium hydroxide is added 10.2 parts of thioglycolic acid, and the reaction mixture is heated at about 100° for about 45 minutes. The resulting solution is cooled to room temperature and acidified with dilute hydrochloric acid. The colorless solid which separated is collected by filtration, washed with water, and dried to afford 6-amino-5-carboxymethylmercaptouracil. This substance darkens at about 260°, but does not melt up to 360°.

Example 33

A suspension of one part of 6-amino-5-carboxymethylmercaptouracil in 21.6 parts of acetic anhydride is heated at reflux for about 6 hours, then filtered to remove the solid material. This solid is extracted with a solution of one part of sodium bicarbonate in 50 parts of water in order to remove any unchanged starting material. The remaining solid is collected by filtration and washed with water, then dissolved in 1 N sodium hydroxide. This alkaline solution is treated with decolorizing carbon, then is acidified with dilute acetic acid to effect precipitation of the product. This precipitate is collected by filtration and dried to yield 3,6,8-triketopyrimido[5,4-b]1,4-thiazine, which darkens at about 300°, but does not melt up to 360°.

What is claimed is:
1. A compound of the formula

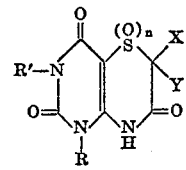

wherein R and R' are selected from the group consisting of hydrogen, lower alkyl, hydroxy(lower alkyl), and lower alkenyl, X and Y are selected from the group consisting of hydrogen, chlorine, bromine, hydroxy, —O-(lower alkyl), —O-(lower alkylene)Cl, and —OCO-(lower alkyl), and $n$ is an integer from 0 to 2 inclusive.

2. A compound of the formula

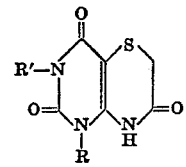

wherein R and R' are lower alkyl.

3. A compound of the formula

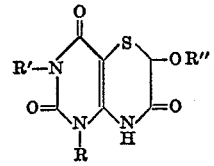

wherein R, R', and R'' are lower alkyl.

4. 5-propyl-7-ethyl-3,6,8-triketopyrimido[5,4-b]1,4-thiazine.

5. 5-allyl-7-ethyl-3,6,8-triketopyrimido[5,4-b]1,4-thiazine.

6. 2-ethoxy-5-propyl-7-ethyl-3,6,8-triketopyrimido[5,4-b]1,4-thiazine.

7. 5-propyl-7-ethyl-3,6,8-triketopyrimido[5,4-b]1,4-thiazine 1,1-dioxide.

8. 2,2-diethoxy-5-propyl-7-ethyl-3,6,8-triketopyrimido[5,4-b]1,4-thiazine.

9. 2-hydroxy-5-propyl-7-ethyl-3,6,8-triketopyrimido[5,4-b]1,4-thiazine.

10. 3,6,8-triketopyrimido[5,4-b]1,4-thiazine.

11. 2-(2-chloroethoxy)-5-propyl-7-ethyl-3,6,8-triketopyrimido[5,4-b]1,4-thiazine.

References Cited in the file of this patent

Culvenor et al.: Jour. Chem. Soc. (London), 1949, pages 278-282.

Rose: Jour. Chem. Soc. (London), 1952, pages 3448-64.